(12) United States Patent
Chawla et al.

(10) Patent No.: US 11,736,454 B2
(45) Date of Patent: Aug. 22, 2023

(54) SECURING CONFIDENTIAL CONTENT IN A VIRTUAL MEETING

(71) Applicant: VMware, Inc., Palo Alto, CA (US)

(72) Inventors: Ravish Chawla, Atlanta, GA (US); Rohit Pradeep Shetty, Bangalore (IN); Adam Chow, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 124 days.

(21) Appl. No.: 17/327,137

(22) Filed: May 21, 2021

(65) Prior Publication Data

US 2022/0377056 A1   Nov. 24, 2022

(51) Int. Cl.
*H04L 9/40* (2022.01)
*H04L 9/14* (2006.01)

(52) U.S. Cl.
CPC ............ *H04L 63/0428* (2013.01); *H04L 9/14* (2013.01)

(58) Field of Classification Search
None
See application file for complete search history.

(56) References Cited

U.S. PATENT DOCUMENTS

2018/0013707 A1* 1/2018 Murphy ................ H04L 51/212

* cited by examiner

*Primary Examiner* — Brandon Hoffman
(74) *Attorney, Agent, or Firm* — Clayton, McKay & Bailey, PC

(57) ABSTRACT

Systems and methods are described for securing confidential content in a virtual meeting. In an example, a host can create a meeting agenda that identifies attendees and access restrictions for the meeting. A server can generate encryption keys corresponding to different confidentiality levels of content identified in the agenda. The encryption keys can be provided to user devices of the attendees based on the access permissions of the attendees. As the virtual meeting takes place, the server can encrypt confidential portions of the content stream for the meeting using the encryption keys. In an example, the server can also apply a machine learning algorithm to identify any confidential content in the content stream not previously identified. The server can encrypt additional confidential content where appropriate using encryption keys corresponding to the confidentiality level of the content.

20 Claims, 5 Drawing Sheets

SECURING CONFIDENTIAL CONTENT IN A VIRTUAL MEETING

BACKGROUND

Technological advances in telecommunications and other related fields have created the possibility for employees to work remotely. More and more employees have been taking advantage of this opportunity where employers allow. The COVID-19 pandemic transformed businesses across the world into telecommuting organizations almost overnight. Because of this, meetings that used to be held in-person have moved to the cloud. Virtual meetings allow people to directly communicate in a business environment from almost anywhere.

The shift to online platforms for meetings has created new security challenges that did not exist for in-person meetings. For example, for in-person meetings, any unauthorized person could be physically denied access to the meeting and any related material. However, with a virtual meeting, such screening methods do not exist that can limit what unwanted entities can view or hear. This requires meeting hosts to take additional steps for security, such as always being aware of who is participating in a call, hold back on certain pertinent information during a call so as to not expose confidential data, and create separate calls for separate groups of people in order to isolate the information that is shared with each party.

As a result, a need exists for a system that provides the same level of security for virtual meetings that exists for in-person ones while addressing the most common issues that meeting hosts and employees face in virtual environments.

SUMMARY

Examples described herein include systems and methods for securing confidential content in a virtual meeting. In an example, a host user can create an agenda for a virtual meeting using a template form in a graphical user interface ("GUI"). The agenda can designate a meeting time, attendees, and any restrictions that should be applied. Some examples of restrictions can include a confidentiality level for the meeting, any segments of the meeting that contain confidential content and a confidentiality level of the segment, any terms or topics that are restricted, any users that are exempt from confidentiality restrictions, whether cameras must be on or off during certain segments of the meeting, and whether attendees may record the meeting.

A virtual meeting server that manages the GUI can generate a data file of the agenda and send it to a data leak prevention ("DLP") server. The DLP server can identify confidential content designated in the agenda. The DLP server can retrieve access permissions of the attendees and compare each attendee's access permissions to the confidentiality level of the confidential content. The DLP server can generate a unique encryption key for each confidentiality level designated in the agenda.

In one example, the DLP server can send the encryption keys and attendee access permissions to the virtual meeting server. The virtual meeting server can provide the appropriate encryption keys to the user devices of the attendees as they connect to the virtual meeting. Alternatively, when a user device connects to the virtual meeting, the user device can also retrieve encryption keys from the DLP server. The user devices can be provided only with the encryption keys that correspond to the access permissions of the user associated with the user device.

In one example, the DLP server can perform a security check on each user device that connects to the virtual meeting. Where a user device is deemed unsecure, the DLP server can enforce a security protocol. Some examples can be denying access to the virtual meeting and withholding one or more encryption keys from the user device.

While the meeting is in progress, the virtual meeting server can send a content stream of the virtual meeting to the DLP server. The DLP server can encrypt portions of the content stream according to the meeting agenda. The DLP server can send the encrypted content stream to the virtual meeting server, which can then send the content stream to the user devices of the attendees. The user devices can decrypt portions of the content stream where they have the appropriate encryption key. Otherwise, the content remains encrypted on that user device so that the user cannot access confidential content that the user does not have permission to access.

In an example, the DLP server can send the content stream to a machine learning ("ML") server. The ML server can apply an ML model that is trained to analyze and interpret a content stream and categorize content within the stream. The ML model can tag confidential content in the content stream and return timestamps indicating when the confidential content occurs in the content stream. Where the feedback from the ML model indicates that a confidential segment is running longer or begins sooner than planned, the DLP server can adjust the timing of the encryptions. In another example, the ML model can tag confidential content not designated in the meeting agenda. The DLP server can determine a confidentiality level of the content and encrypt it with a corresponding encryption key.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for securing confidential content in a virtual meeting. In an example, a host can create a meeting agenda that identifies attendees and access restrictions for the meeting. A server can generate encryption keys corresponding to different confidentiality levels of content identified in the agenda. The encryption keys can be provided to user devices of the attendees based on the access permissions of the attendees. As the virtual meeting takes place, the server can encrypt confidential portions of the content stream for the meeting using the encryption keys. In an example, the server can also apply a machine learning algorithm to identify any confidential content in the content stream not previously identified. The server can encrypt additional confidential content where appropriate using encryption keys corresponding to the confidentiality level of the content.

Figure 1:
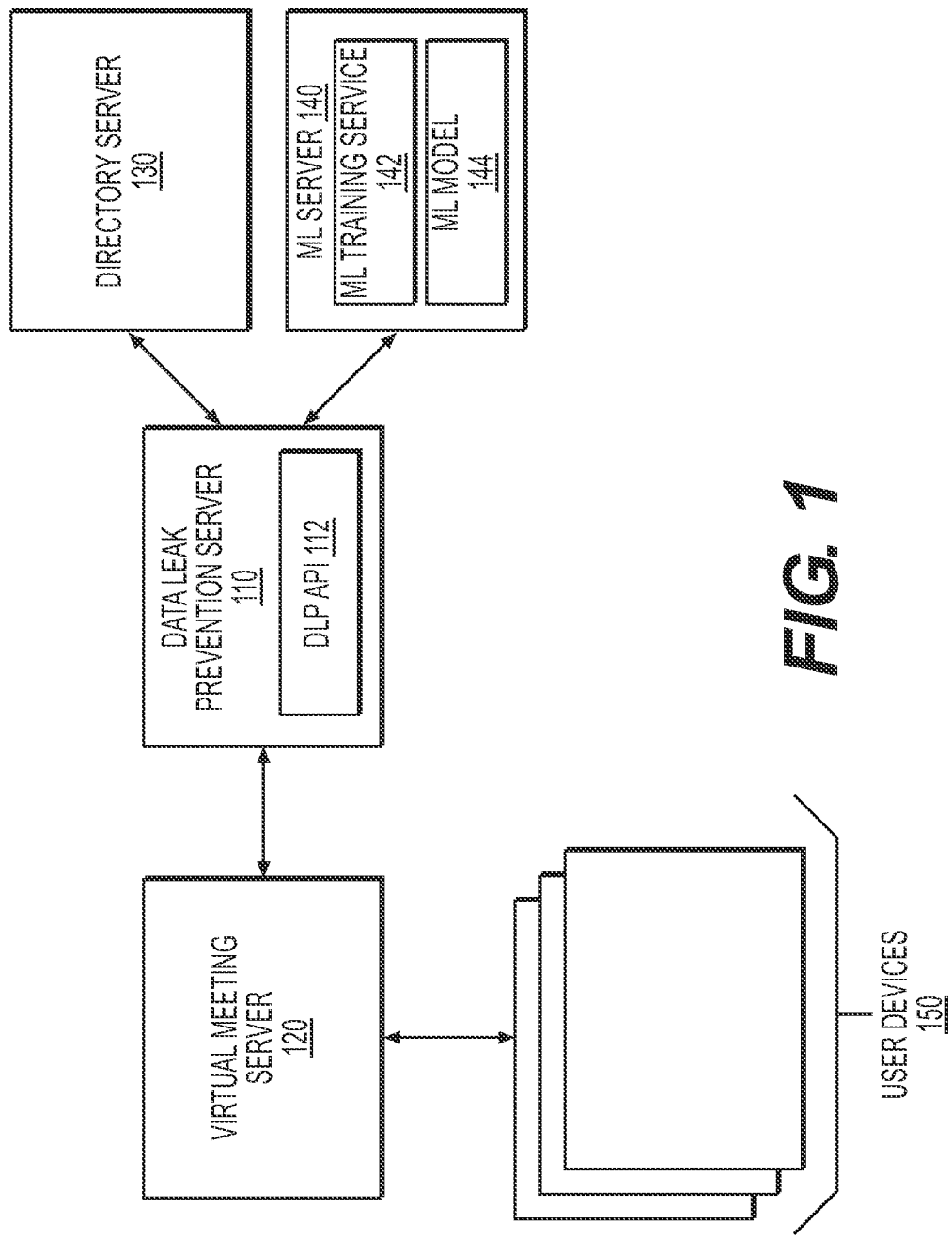
FIG. 1 is an illustration of a system for securing confidential content in a virtual meeting.

FIG. 1 is an illustration of a system for securing confidential content in a virtual meeting. In an example, the content stream can be for a virtual meeting, such as an online meeting with video and/or audio. The online meeting can be hosted by a virtual meeting server 120. The virtual meeting server 120 can be a server or group of servers, including multiple servers implemented virtually across multiple computing platforms, that hosts virtual meetings, such as ZOOM, MICROSOFT TEAMS, or GOOGLE MEET. The virtual meeting server 120 can provide an interface, such as a GUI, that includes a template that a user can use to create an agenda for the virtual meeting. The user that creates a virtual meeting can designated a host user.

In an example, the GUI can allow the host user to designate the time, subject, and attendees of the meeting, as well as provide any necessary data files relevant to the meeting. The GUI can also allow the host user to specify any restrictions for the meeting. As some examples, the host user can designate a default confidentiality level for the meeting, any terms or topics that are restricted, any users that are exempt from confidentiality restrictions, whether cameras must be on or off during certain segments of the meeting, and whether attendees are allowed to record the meeting.

In an example, the virtual meeting server 120 can generate a data file of the meeting agenda and send it to a DLP server 110. In one example, the agenda data file can be a markup file, such as an extensible markup language ("XML") or YAML Ain't Markup Language ("YAML") file. In another example, the virtual meeting server 120 can send the agenda data file over a network by way of an Application Programming Interface ("API") call or network protocol, such as HTTP, SOAP, REST, and/or other protocols. In one example, the DLP server 110 can include a DLP API 112 that the virtual meeting server 120 can interact with to exchange data with the DLP server 110.

The DLP server 110 can be responsible for managing virtual meetings for an organization and securing confidential content. The DLP server 110 can be a single server or a group of servers. In an example, the DLP server 110 can be part of a Unified Endpoint Management ("UEM") system that allows enterprises to manage work-related applications and data on enrolled user devices 150. Users can enroll their own devices, such as cell phones, tablets, or laptops. Enrollment can include installing managed applications and other resources on the user device 150. For example, enrolled user devices 150 can include a management application that can be responsible for ensuring that user devices are up to date with compliance and security settings prior to accessing enterprise data and resources. The management application can communicate with a management server, allowing UEM system management of user devices 150 based on compliance and security settings at the management server.

Users that are members of the enterprise can be assigned access permissions for various levels of confidential content. In an example, the user permissions can be stored at a directory server 130. In one example, the directory server 130 can be a single server or a group of servers. In another example, the directory server 130 can be a storage device, such as a database server, that is accessible by the DLP server 110. The DLP server 110 can retrieve access permissions of meeting attendees from the directory server 130. In one example, the meeting agenda data file can include user identifiers ("ID") of attendees specified by the host user. The DLP server 110 can provide the user IDs to the directory server 130 and receive the accession permissions of the attendees in response.

In an example, the DLP server 110 can use the meeting agenda data file to determine how to protect confidential content scheduled to be part of the virtual meeting. For example, the DLP server 110 can compare the access permissions of the attendee users to the confidentiality levels of content identified in the agenda data file. The DLP server 110 can create encryption keys corresponding to any confidential content that at least one attendee user does not have permission to access. The encryption keys can use any kind of encryption method, such as cryptographic hashes or Public Key Infrastructure ("PKI"). In one example, the DLP server 110 can provide the encryption keys to the virtual meeting server 120 along with information identifying which users should receive which keys. When users connect to the virtual meeting through their user devices 150, the virtual meeting server 120 can provide the appropriate keys. Alternatively, when the user devices 150 connect to the virtual meeting, they can also be configured to retrieve the keys directly from the DLP server 110.

In an example, when the virtual meeting starts, the virtual meeting server 120 can send a content stream of the meeting to the DLP server 110. The DLP server 110 can use the agenda meeting data file to encrypt portions or segments of the content stream that correspond to the identified confidential content. The methods used to encrypt portions of the content stream are described in more detail later herein.

In an example, the DLP server 110 can send the content stream to an ML server 140. The ML server 140 can include a training server 142 that trains an ML model 144 to identify and classify content in a content stream. For example, the ML training service 142 can train the ML 144 model to identify and classify words, text, images, and other types of content that may appear in a meeting content stream. In one example, the ML model 144 can use video and audio processing tools like audio transcription, optical character recognition ("OCR"), and computer vision to interpret and understand the content stream.

In an example, the ML model 144 can process the content stream to classify sections of the content stream to different restriction levels and return timestamps where those restrictions apply. The DLP server 110 can then use the timestamps to apply or modify encryption of those sections. For example, where a scheduled segment of the meeting concludes early or lasts longer than its scheduled time, the ML model 144 can identify this and notify the DLP server 110. The DLP server can then modify the encryption timing for the affected sections. In another example, the ML model 144 can identify confidential content not identified in the meeting agenda, and the DLP server 110 can determine whether encryptions should be adjusted or added accordingly.

In an example, the DLP server 110 can send the partially encrypted content stream back to the virtual meeting server 120. The virtual meeting server 120 can distribute the content stream to the user devices 150. The user devices 150 can decrypt the portions of the content stream that they have the appropriate encryption keys for.

Figure 2:
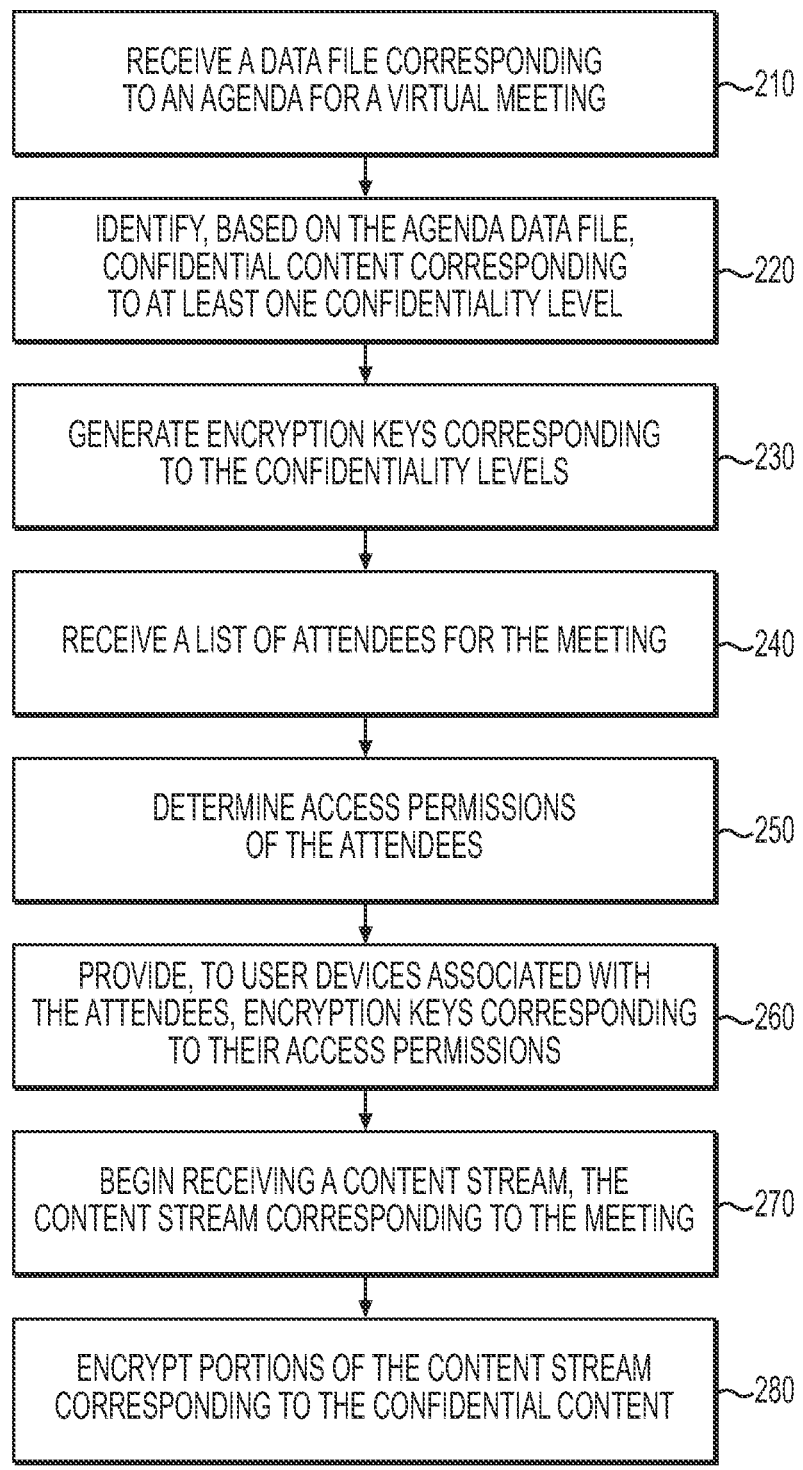
FIG. 2 is a flowchart of an example method for securing confidential content in a virtual meeting.

FIG. 2 is a flowchart of an example method for securing confidential content in a virtual meeting. At stage 210, the DLP server 110 can receive a data file corresponding to an agenda for a meeting. In an example, the agenda data file can be generated based on input by a host user. For example, the virtual meeting server 120 can include a GUI that allows a host user to create a virtual meeting. The GUI can include a template where the host user can designate confidential content that may be part of the meeting. In one example, the host user can provide a schedule for the meeting that designates segments of the meeting that will include confidential content and attendees for the meeting. The host user can also designate a level of confidentiality for each segment, in an example. The GUI can also allow the host user to specify extra restrictions or exceptions. As some examples, the host user can designate a default confidentiality level for the meeting, any terms or topics that are restricted, any users that are exempt from confidentiality restrictions, and whether cameras must be on or off during certain segments. The restrictions from the meeting agenda can be static restrictions, meaning that they will always be enforced regardless of any content classifications performed by an ML algorithm as described later herein.

In an example, the meeting agenda data file can be received from the virtual meeting server 120. For example, the user can create the meeting agenda from a user device 150 using an application, such as a web application, hosted by the virtual meeting server 120. The virtual meeting server 120 can create a data file based on the user's input and send it to the DLP server 110. In an example, the agenda data file can be a markup file, such as an XML or YAML file. The virtual meeting server 120 can send the agenda data file over a network by way of an API call or network protocol, such as HTTP, SOAP, REST, and/or other protocols.

At stage 220, the DLP server 110 can identify, based on the agenda data file, confidential content corresponding to at least one confidentiality level. In an example, the confidential content can be indicated in the agenda data file. For example, the agenda data file can indicate what sections of the meeting will include confidential content, the type of confidential content that will be included, and the timing when the confidential content will be presented. As some examples, confidential content can include audio or visual images related to confidential content. In one example, the agenda data file can indicate that a discussion topic for a segment of the meeting relates to confidential content. The DLP server 110 can identify the audio portion of that segment as confidential content. In another example, the agenda data file can indicate that confidential content will be displayed during a segment of the meeting, and the DLP server 110 can identify the video portion of that segment as confidential content.

In an example, the DLP server 110 can identify confidential content by applying the ML model 144 to a content stream of the meeting. For example, the ML training service 142 can train the ML 144 model to identify and classify words, text, images, and other types of content that may appear in a meeting content stream. As an example, the ML model 144 can use computer vision to process and analyze the audio and video from the content stream to interpret a real world meaning to the content. The ML model 144 can classify segments of the content stream and apply tags that correspond to each segment's confidentiality level. The tags can include timestamps that indicate when a segment of a confidentiality level begins and ends. This can help identify and protect any confidential content not previously identified in the meeting agenda.

At stage 230, the DLP server 110 can generate encryption keys corresponding to the confidentiality levels. In an example, the DLP server 110 can generate an encryption key for each level of confidential content identified in the meeting agenda. The encryption keys can be symmetric or asymmetric. In one example, the DLP server 110 can generate a private/public key pair. The DLP server 110 can encrypt confidential content in the content stream using the private key and provide the public key to user devices 150 for decrypting the content.

At stage 240, the DLP server 110 can receive a list of attendees for the meeting. In one example, the list can be provided as part of the agenda data file. For example, when the host creates the meeting agenda, the host can select attendees that are invited to the meeting. The host can also add or remove attendees after scheduling the meeting and before the meeting starts. These attendee updates can be provided to the DLP server 110 from the virtual meeting server 120, in an example.

At stage 250, the DLP server 110 can determine access permissions of the attendees. For example, the attendee list can include user IDs for each attendee. The user IDs can map to permission levels stored in the directory server 130. The DLP server 110 can retrieve each attendee's permission level from the directory server 130. The DLP server 110 can then compare the attendee permission levels to the confidentiality levels from the agenda data file to determine which content in the planned meeting each attendee does and does not have permission to access.

At stage 260, the DLP server 110 can provide encryption keys to user devices 150 associated with the attendees corresponding to the attendees' confidentiality levels. In an example, the first encryption key can be a public key of a key pairing. In one example, the DLP server 110 can send the first encryption key, and any other encryption keys corresponding to other confidentiality levels, to the virtual meeting server 120. When a user device 150 requests to access the virtual meeting, the virtual meeting server 120 can obtain credentials from the user device 150. In an example, the credentials can include a user ID for a user associated with the user device 150. The virtual meeting server 120 can respond to the request with encryption keys for confidentiality levels the user has access to.

At stage 270, the DLP server 110 can begin receiving a content stream for the meeting. In an example, the content stream can be received from the virtual meeting server 120. For example, the host and attendees can log into an application for the virtual meeting. The application can be a dedicated application on the user devices 150 in an example, and alternatively a web application hosted by the virtual meeting server 120. The virtual meeting server 120 can begin sending the content stream to the DLP server 110 based on settings at the virtual meeting server 120. For example, the content stream can begin at the scheduled start time or when the host user joins the meeting, as some examples.

At stage 280, the DLP server 110 can encrypt portions of the content stream corresponding to the confidential content. In one example, the portions can correspond to both audio and video segments of the meeting. In another example, the audio and video portions of the content stream can be treated separately so that the DLP server 110 can encrypt one or the other. In yet another example, the DLP server 110 can encrypt only a portion of the video. For example, the DLP server 110 can encrypt a certain graphic or portion of the video being broadcast.

In an example, the content stream can include multiple portions of confidential content with varying levels of confidentiality. The DLP server 110 can use a different encryption key for each confidentiality level. As an example, the meeting agenda can indicate sections of the meeting corresponding to three different confidentiality levels: low, medium, and none. The DLP server 110 can encrypt the low-level confidential content with a first encryption key and the medium level content with a second encryption key. For the portions of the meeting that do not correspond to a confidentiality level, the DLP server 110 need not encrypt the content stream. In one example, however, the entire content stream can be encrypted for security reasons, such as by the DLP server 110 or the virtual meeting server 120. In such an example, the confidential content can be double encrypted.

In an example, the confidential content that gets encrypted can depend on the attendee list. For example, where all attendees have permission to access the highest level of confidential content in the meeting, then no additional encryption is needed. In another example, the meeting agenda can indicate three levels of confidential content: low, medium, and high. The attendee list can include a mixture of users that have access up to medium and high confidential level content. In this example, the medium-level content can be encrypted with one encryption key and the high-level content can be encrypted with another encryption key, but the low-level content does not need any additional encryption because all attendees have access to it.

In an example, the DLP server 110 can provide encryption keys to the user devices 150 according to the permissions of each user device's corresponding user. For example, for users with access to only low-level confidential content, the DLP server 110 can provide their user devices 150 with only the encryption key the decrypts the low-level confidential content. Users with access to medium-level confidential content can receive encryption keys for the low-level and medium-level confidential content, and users with access to high-level confidential content can receive encryption keys to all three levels.

The following is an example of the method described above. A meeting host can complete a meeting agenda from using a template in a GUI. The meeting agenda can include approximate time segments of certain topics and the confidentiality level of those time segments. The meeting host can also provide a list of attendees for the meeting. The virtual meeting server 120 can receive the agenda and attendee list and then send them to the DLP server 110. The DLP server 110 can retrieve the access permissions of each attendee from the directory server 130. The DLP server 110 can use the access permissions to determine which confidential content should be encrypted and which users will have access to which content.

Access permissions can be based on a variety of factors. For example, a user's employee status can be an important factor in a user's access to confidential content. As an example, a user's access can depend on whether the user is a permanent employee or contractor, any groups or the user belongs to, and any security designations. That status of the user device 150 of an attendee can affect access permissions. For example, if a user device 150 used by an attendee to join the meetings has been deemed insecure, then various restrictions could be applied on the user device 150, including limiting the encryption keys that the user device 150 received or preventing the user device 150 from joining the meeting at all.

Another factor can include the physical location of the user device 150. Location data can be obtained by using a Global Positioning Service ("GPS") on the user device 150 or its Internet Protocol ("IP") address, as some examples. In one example, based on the confidentiality level of the meeting, the user might be allowed access to a meeting or recording only if the user device 150 is within a whitelisted geo-fenced area. In another example, access can be allowed in all areas except blacklisted areas, such as a publicly crowded area. User access to confidential meetings or confidential content in a meeting can be restricted if the user device 150 connects to the meeting via a public Wi-Fi network. This can help prevent a man in the middle ("MITM") attack.

In one example, the DLP server 110 can use Bluetooth scanning by the user device 150 to determine any access restrictions. For example, the user device 150 can use Bluetooth scanning to see what devices are in proximity, and identify their origin based on the signal. This information can be used to identify the devices in close proximity to the user device 150 and regulate meeting access. For example, if Bluetooth scanning identifies a device with an unsecure Bluetooth version, then the DLP server 110 can determine that there might be unsecure devices in the area of the user device 150 that can access data. The DLP server 110 can adjust that user's access accordingly.

In one example, encryptions keys can be dynamically revoked during a virtual meeting. For example, the security status of the user devices 150 of the attendees can be monitored during the virtual meeting. If an event occurs that causes a user device 150 to be considered unsafe according to the standards of the virtual meeting, the DLP server 110 can revoke the encryption keys of that user device 110. As an example, if Bluetooth scanning by a user device 110 suddenly identifies a device with an unsecure Bluetooth version during the virtual meeting, the DLP server 110 can revoke the encryption keys of that user device 110. If for any reason the DLP server 110 is unable to revoke the encryption key from the user device 110 that is deemed insecure, the DLP server 110 can create an issue new encryption keys and distribute them to the other user devices 110 in the virtual meeting. The DLP server 110 can then use the new encryption keys to encrypt the virtual meeting, and the insecure user device 110 will be unable to decrypt the content stream. In one example, where an insecure user device 110 regains secure status, such as where Bluetooth scanning determines that an insecure device is no longer nearby, the DLP server 110 can restore the encryption keys to the user device 110.

The DLP server 110 can generate encryption keys for the levels of confidential content that need to be encrypted. The DLP server 110 can send the encryption keys and the access permissions of the attendee users to the virtual meeting server 120. When the users log into the virtual meeting server 120 for the virtual meeting, the virtual meeting server 120 can provide the user devices 150 with their corresponding encryption keys. Once the meeting begins, the virtual meeting server 120 can send the content stream of the meeting to the DLP server 110. The DLP server 110 can encrypt the content stream according to the meeting agenda using the encryption keys. The DLP server 110 can send the encrypted content stream to the virtual meeting server 120, which can in turn provide the encrypted content stream to the user devices 150. The user devices 150 can encrypt the content stream using their encryption keys. For any portions of the meeting that a user does not have permission to access, that user's user device 150 will not be able to decrypt the content.

Furthering the example above, the DLP server 110 can apply the ML model 144 to the content stream. The ML model 144 can perform multiple functions in analyzing the content stream. In one example, the ML model 144 can analyze the audio and video to determine whether the meeting is keeping with the planned schedule from the meeting agenda. The ML model 144 can indicate to the DLP server 110 when meeting segments are running ahead or behind, and the DLP server 110 can adjust the encryptions accordingly. In another example, the ML model 144 can also analyze the content stream to determine if the users begin talking about a confidential topic not included in the meeting agenda. The ML model 144, or the DLP server 110, can determine the confidentiality level of the off-topic discussion and, if necessary, the DLP server 110 can encrypt the confidential content with an appropriate encryption key. In an example, the ML model 144 can transcribe the audio and use natural language processing to identify confidential content and determine whether encryptions should be adjusted or added. In another example, the ML model 144 can analyze the video to identify confidential content. For example, the ML model 144 can use an OCR tool to identify text in the video of the content stream and then use natural language processing to identify confidential content and determine whether encryptions should be adjusted or added. In one example, the ML model 144 can utilize an artificial intelligence tool like computer vision to interpret and understand the video portion of the content stream.

In an example of the method described above, a host user can create a meeting agenda as follows:

Host: Host Name
Restricted Content:
Boxer
Q3 Results
Default Confidentiality: Medium
Restrictions:
Camera [on/off]
Content Locker [full access/limited access]
00:00-00:15
High Confidentiality Level
00:15-00:45
Medium Confidentiality Level
00:45-00:60
Restricted Confidentiality Level
Exceptions:
Attendee One
Attendee Two In the example agenda shown above, "Boxer" and "Q3 Results" are restricted topics that should not be discussed during the meeting. The DLP server 110 can apply the ML model 144 to the content stream, and if any attendee user discusses or displays the restricted content, the DLP server 110 can take preventative action. For example, the DLP server 110 can mute the microphone, terminate the video feed, or disconnect the user device 150 in violation of the restriction.

In the example agenda, the host user has set the default confidentiality level to medium. This can cause the DLP server 110 to encrypt the entire content stream using an encryption key that it provides to all attendees with that access level. Any attendees without medium confidentiality level access that are not listed as exceptions will not be able to access the meeting. The host user also identified three segments of the meeting at their corresponding confidentiality levels. The "00:00-00:15" segment is designated for high confidentiality level content. The DLP server 110 can encrypt that segment of the meeting with an encryption key that it provides only to user devices 150 of users with access to such content. The "00:15-00:30" segment is designated for medium confidentiality level content. Because the default confidentiality level of the meeting is medium, the DLP server 110 need not add any additional encryption to this segment. Finally, the "00:30-00:45" segment is designated for restricted confidentiality level content. The DLP server 110 can encrypt that segment of the meeting with an encryption key that it provides only to user devices 150 of users with access to such content. User devices 150 with access to multiple levels confidential content in the meeting can receive multiple encryption keys corresponding to the segments the user is authorized to access.

The example meeting agenda also includes an exceptions list. The two exceptions, "Attendee One" and "Attendee Two," can be exempt from the restrictions and receive encryption keys for all the content regardless of the access permissions. In one example, the host user can input exceptions that apply to a particular section or restriction instead of the entire meeting.

In an example, a GUI for the virtual meeting can include controls that allows a user to dynamically modify confidentiality levels and redactions during the virtual meeting. In one example, such controls can be provided only to the meeting host. The GUI can display the segments of redacted content in the content stream and their corresponding confidentiality levels. Control in the GUI can allow the host user to modify the confidentiality levels of content to restrict or relax the access permissions. In one example, where the meeting deviates from the planned agenda into a discussion on something unplanned, the host user can manually set the confidentiality level in the GUI. The host user can also designate when the meeting has returned to the planned agenda.

Figure 3:
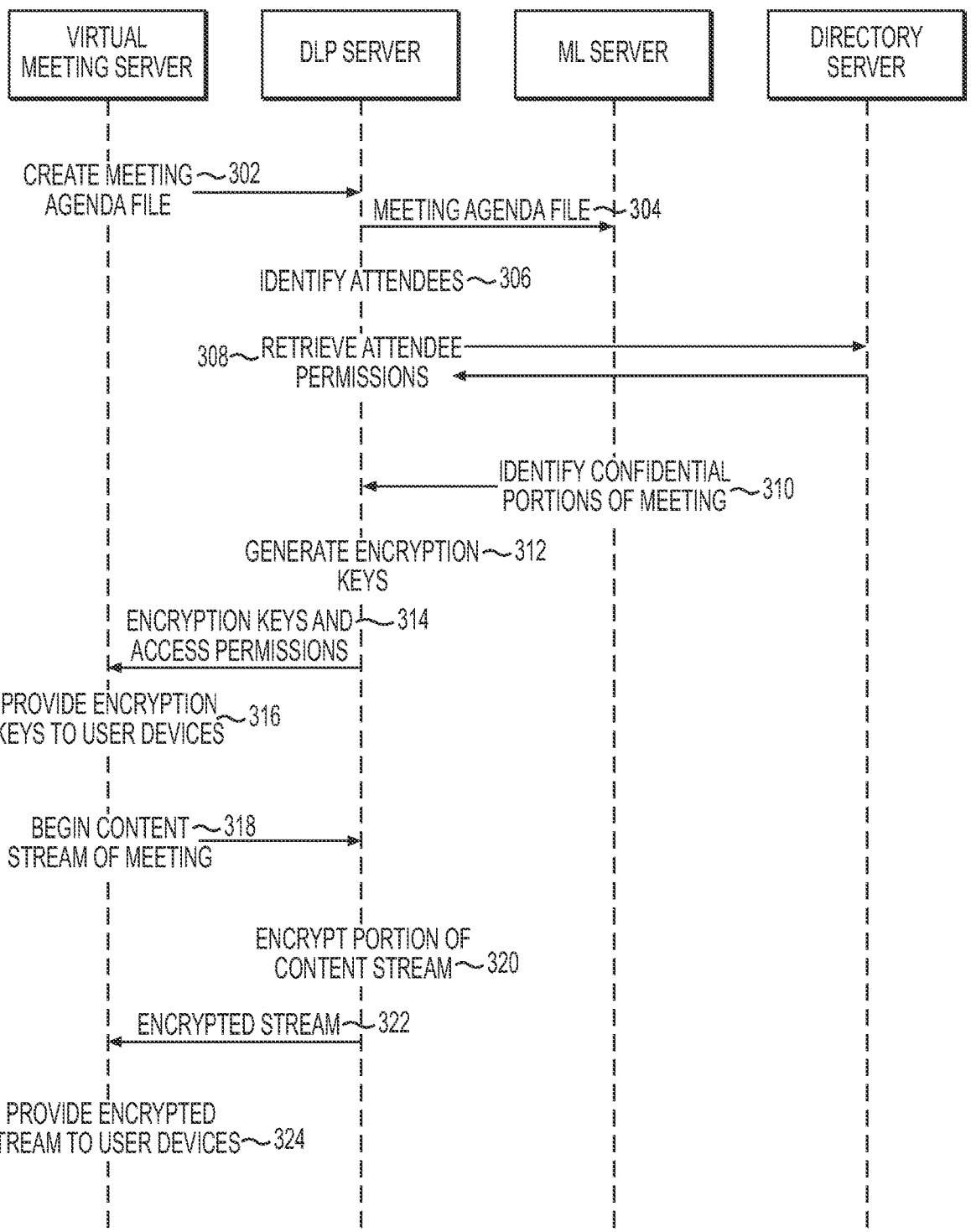
FIG. 3 is a sequence diagram of an example method for securing confidential content in a virtual meeting.

FIG. 3 is a sequence diagram of an example method for securing confidential content in a virtual meeting. At stage 302, the virtual meeting server 120 can create an agenda data file. The agenda file can indicate time segments for a virtual meeting, confidential content that will be included during each segment, and confidentiality levels for each segment. In an example, the agenda file can be created by the meeting host using a GUI. In an example, the agenda data file can be a markup file, such as an XML or YAML file. In an example, the virtual meeting server 120 can create the agenda file based on the host user's inputs. The virtual meeting server 120 can then send the agenda file to the DLP server 120. In an example, the virtual meeting server 120 can send the agenda data file over a network by way of an API call or network protocol, such as HTTP, SOAP, REST, and/or other protocols.

At stage 304, the DLP server 110 can send the agenda data file to the ML server 140. In one example, the ML model 144 can be stored on the DLP server 110, thus obviating the need to send the agenda meeting to the ML server 140. For example, the ML model 144 can be trained on the ML server 140 and sent to the DLP server 110.

At stage 306, the DLP server 110 can identify attendees for the meeting. In one example, the agenda file can include user IDs for attendees. The attendees can be selected by the host user when creating the meeting agenda, in an example. In one example, the virtual meeting server 120 can send the user IDs of the attendees to the DLP server 120. In another example, the virtual meeting server 120 can create a meeting ID for the virtual meeting and map the user IDs of the attendees to the meeting ID. The virtual meeting server 120 can send the meeting ID and mappings to the directory server 130. The virtual meeting server 120 can also send the meeting ID to the DLP server 110.

At stage 308, the DLP server 110 can retrieve permission for the attendees from the directory server 130. In one example, the DLP server 110 can request the permissions of the attendees using the user IDs of each attendee. The directory server 130 can look up the user permissions and provide them to the DLP server 110. In an example where the virtual meeting server 120 sends the meeting ID and mappings to the directory server 130, the DLP server 110 can send the meeting ID to the directory server 130. The directory server 130 retrieve the user IDs of the attendees and their corresponding permissions. The directory server 130 can then send the user IDs and permissions to the DLP server 110.

At stage 310, the ML server 140 can identify confidential portions of the meeting. Confidential portions can be portions of the meeting that include confidential content. In an example, the ML server 140 can identify the confidential portions by applying the ML model 144. In an alternative example where the DLP server 110 stores the ML model 144, the DLP server 110 can apply the ML model 144 to identify the confidential portions instead of the ML server 140.

In an example, the ML 144 model can identify and classify words, text, images, and other types of content that may appear in a meeting content stream. The ML model 144 can classify segments of the content stream and apply tags that correspond to each segment's confidentiality level. The tags can include timestamps that indicate when a segment of a confidentiality level begins and ends.

At stage 312, the DLP server 110 can generate encryption keys. The encryption keys can correspond to the confidentiality levels of the meeting segments. In an example, the DLP server 110 can generate an encryption key for each level of confidentiality identified in the meeting agenda. The encryption keys can be symmetric or asymmetric. In one example, the DLP server 110 can generate a private/public key pair. The DLP server 110 can encrypt confidential content in the content stream using the private key and provide the public key to user devices 150 for decrypting the content. In another example, instead of generating encryption keys, the DLP server 110 can retrieve encryption keys from an encryption key generation service.

At stage 314, the DLP server 110 can send the encryption keys to the virtual meeting server 120. In one example, the encryption keys can be the public keys of an encryption key pairing. In another example, the DLP server 110 can indicate the confidentiality level that each encryption key corresponds to. At stage 316, the virtual meeting server 120 can send the encryption keys to the user devices 150 of the attendees. In an example, the keys can be sent according to the permission levels of the user. For example, if a user has permission to access medium level confidential content, then the virtual meeting server 120 can send encryption keys for any medium-level confidential content and lower to that user's device 150. Where a user has access to all confidential levels, that user's device 150 can receive encryption keys for all levels of confidential content expected in the meeting.

At stage 318, the virtual meeting server 120 can begin sending a content stream of the meeting to the DLP server 110. For example, the host and attendees can log into an application for the virtual meeting. The application can be a dedicated application on the user devices 150 in an example, and alternatively a web application hosted by the virtual meeting server 120. When the meeting starts, the virtual meeting server 120 can send the content stream to the DLP server 110 for encryption.

At stage 320, the DLP server 110 can encrypt portions of the content stream corresponding to the confidential portions of the meeting. In one example, the portions can correspond to both audio and video segments of the meeting. In another example, the audio and video portions of the content stream can be treated separately so that the DLP server 110 can encrypt one or the other. In yet another example, the DLP server 110 can encrypt only a portion of the video. For example, the DLP server 110 can encrypt a certain graphic or portion of the video being broadcast.

The DLP server 110 can use a different encryption key for each confidentiality level. For example, the DLP server 110 can encrypt low-level confidential content with a first encryption key, medium level content with a second encryption key, and so on. In an example, the amount of encryption keys used can depend on the permission levels of the attendees. For example, where all attendees have permission to access the highest level of confidential content in the meeting, then no additional encryption is needed. In another example, a virtual meeting can include attendees with permission levels ranging from medium to high. In this example, the DLP server 110 need not encrypt any content of medium level or lower content because all attendees have permission to access such content. The DLP server 110 can encrypt high-level content and provide encryption keys to the user devices 150 for users with high level access.

At stage 322, the DLP server 110 can send the encrypted content stream to the virtual meeting server 120. At stage 324, the virtual meeting server 120 can send the encrypted content stream to the attendee user devices 150. The user devices 150 can display the content stream for the users attending the meeting. When an encrypted portion of the content stream is received, each user device 150 can determine whether it possesses the appropriate encryption key. If so, the user device 150 can decrypt the encrypted portion so that the user may access the content. Otherwise, the user device 150 will be unable to decrypt the confidential content.

In another example of the method described above, the content stream can be encrypted at the virtual meeting server 120. As an example, the virtual meeting server 120 can be a third-party server for an online video meeting service, such as ZOOM, MICROSOFT TEAMS, or GOOGLE MEET. The virtual meeting server 120 can generate a meeting agenda file and send it to the DLP server 110. The DLP server 110 can retrieve user access permissions for attendees from the directory server 130, generate encryption keys for confidential content identified in the meeting agenda, and send the encryption keys and access permissions to the virtual meeting server 120. The virtual meeting server 120 can provide the appropriate encryption keys to the user devices 150 and encrypt the content stream of the virtual meeting using the appropriate encryption keys.

Figure 4:
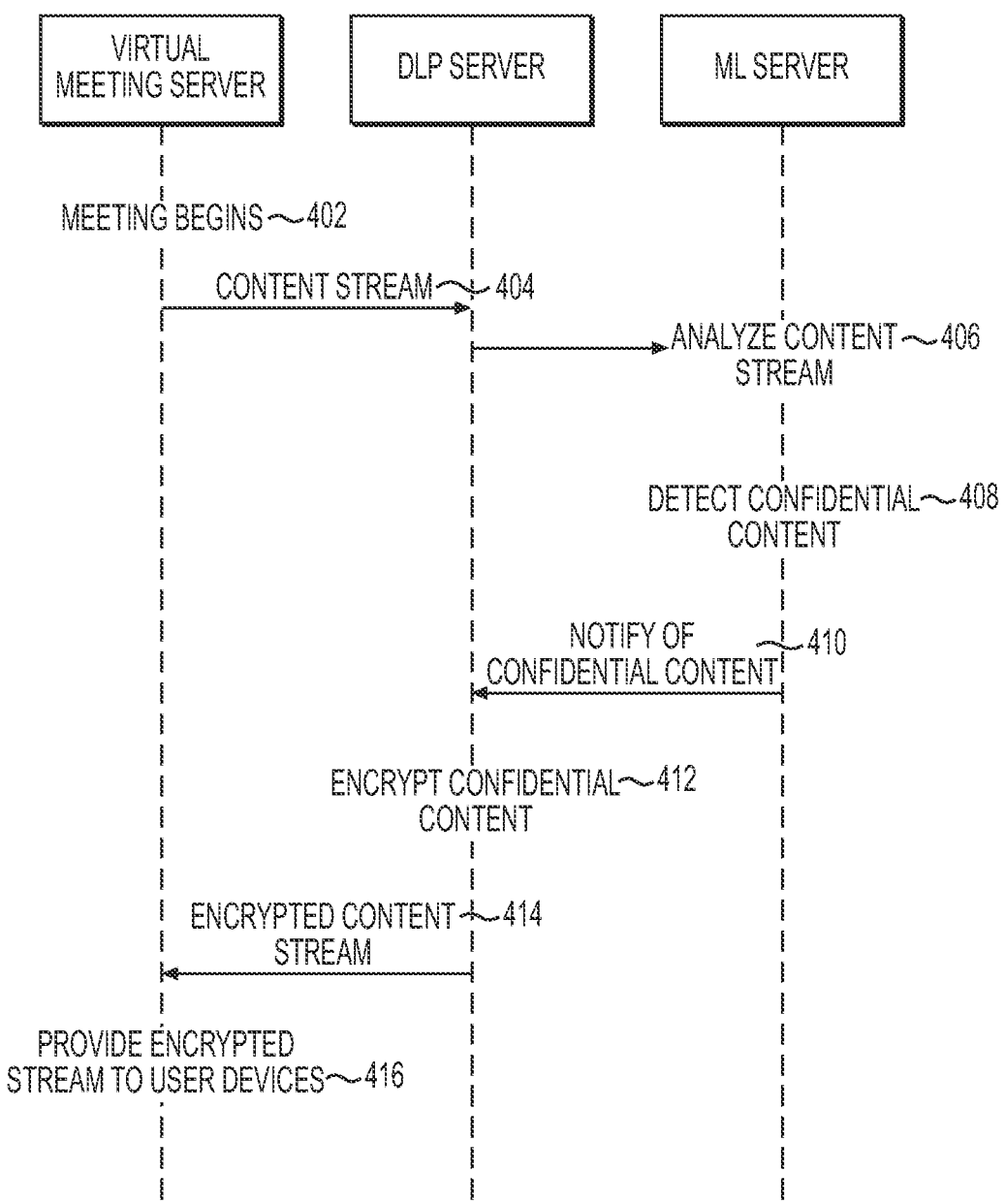
FIG. 4 is a second sequence diagram of an example method for securing confidential content in a virtual meeting.

FIG. 4 is a second sequence diagram of an example method for securing confidential content in a virtual meeting that includes analyzing an active content stream. At stage 402, a virtual meeting can begin. For example, the virtual meeting can begin at a scheduled time or when initiated by a host user.

At stage 404, the virtual meeting server 120 can begin sending a content stream of the meeting to the DLP server 110. The content stream can include audio and video of the virtual meeting. In one example, stage 404 can correspond with stage 318 of FIG. 3. For example, prior to the meeting beginning at stage 402, the virtual meeting server 120 can send a meeting agenda data file to the DLP server 110, which the DLP server 110 can use to retrieve access permissions of the invited attendees and identify confidential content. The DLP server 110 can create encryption keys corresponding to the confidential content, and the DLP server 110 can send the encryption keys and attendee user permissions to the virtual meeting server 120. So, when the meeting begins at stage 402, the user devices 150 can already be in possession of their appropriate encryption keys and the DLP server 110 can be in possession of the timing schedule for the confidential content to be included in the meeting.

At stage 406, the ML model 144 can analyze the content stream. In one example, the DLP server 110 can send the content stream to the ML server 140, where the ML model 144 can analyze the content stream. In another example, the DLP server 110 can include a copy of the ML model 144 that analyzes the content stream.

In one example, analyzing the content stream and include analyzing the audio and video to determine whether the meeting is keeping with the planned schedule from the meeting agenda. For example, the ML model 144 can indicate to the DLP server 110 when meeting segments are running ahead or behind, and the DLP server 110 can adjust the timing of encryptions accordingly. In another example, the ML model 144 can also analyze the content stream to determine if the attendees begin talking about a confidential topic not included in the meeting agenda. The ML model 144 can determine the confidentiality level of the off-topic content and, if necessary, the DLP server 110 can encrypt the confidential content with an appropriate encryption key. In an example, the ML model 144 can transcribe the audio and use natural language processing to identify confidential content and determine whether encryptions should be adjusted or added. In another example, the ML model 144 can analyze the video to identify confidential content. For example, the ML model 144 can use an OCR tool to identify text in the video of the content stream and then use natural language processing to identify confidential content and determine whether encryptions should be adjusted or added. In one example, the ML model 144 can utilize an artificial intelligence tool like computer vision to interpret and understand the video portion of the content stream.

At stage 408, the ML model 144 can detect confidential content in the content stream. For example, the ML model 144 can compare data analyzed at stage 406 and compare it to known confidential categories. For example, the ML model 144 can classify content identified in the content stream using the tools described herein, and then it can compare the classifications to a database of confidential categories. Where is positively identified as confidential, the ML model 144 can also identify the confidentiality level of the content category. In one example, the ML model 144 can apply a tag that identifies what portion of the content stream contains confidential content and the confidentiality level of the content. At stage 410, the ML model 144 can notify the DLP server 110 of the confidential content.

At stage 412, the DLP server 110 can encrypt portions of the content stream corresponding to the confidential content. The encryption key used to encrypt the confidential content can depend on its confidentiality level. For example, where the DLP server 110 previously issued encryption keys for different confidentiality levels of content identified from the meeting agenda, the DLP server can use the same keys to encrypt the newly identified confidential content.

In one example, the DLP server 110 can begin encrypting a portion of the content stream early or extend encrypting a portion based on the ML model 144 analysis. For example, the ML model 144 can analyze the content stream to verify that the timing of the meeting schedule according to the meeting agenda. For example, the meeting agenda can identify categories of confidential content that will be part of the meeting and the timing of when such content should be encrypted. The ML model 144 can analyze the content stream to verify that the confidential content identified in the meeting agenda occurs as planned. Where a segment of the meeting runs late, the ML model 144 can detect that the corresponding portion of the content stream needs to continue to be encrypted, and any planned encryption from the meeting agenda should be delayed. The ML model 144 can then determine when the meeting has progressed to the next segment and inform the DLP server 110 accordingly. Similarly, when a segment ends before the planned time, the ML model 144 can notify the DLP server, and the DLP server 110 can transition the encryption configuration to the next segment.

At stage 414, the DLP server 110 can send the encrypted content stream to the virtual meeting server 120. At stage 416, the virtual meeting server 120 can provide the encrypted content stream to the attendee user devices 150. The user devices 150 can display the content stream for the users attending the meeting. When an encrypted portion of the content stream is received, each user device 150 can determine whether it possesses the appropriate encryption key. If so, the user device 150 can decrypt the encrypted portion so that the user may access the content. Otherwise, the user device 150 will be unable to decrypt the confidential content.

In one example, the application of the ML model 144 can be offloaded to the virtual meeting server 120. For example, the virtual meeting server 120 can include a copy of the ML model 144. In such an example, the virtual meeting server 120 can apply the ML model 144 to the content stream of the meeting to identify and encrypt confidential content.

Figure 5:
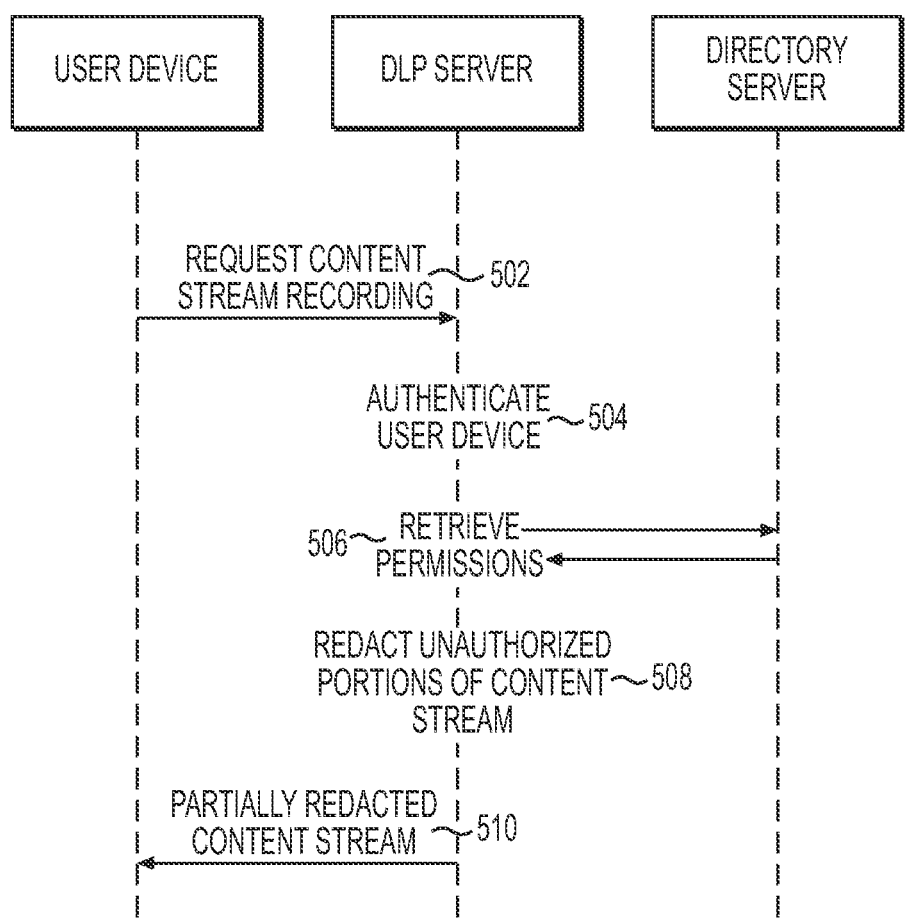
FIG. 5 is a third sequence diagram of an example method for securing confidential content in a virtual meeting.

FIG. 5 is a third sequence diagram of an example method for securing confidential content in a virtual meeting that includes providing a recording of a content stream with confidential content to a user device 150. At stage 602, the user device 150 can request a content stream corresponding to a recorded meeting. The request can be made over a network by way of an API call or network protocol, such as HTTP, SOAP, REST, and/or other protocols.

At stage 504, the DLP server 110 can authenticate the user device 150. For example, the request at stage 502 can include credentials associated with the user device 150. The credentials can include a user ID for a user associated with the user device 150, in an example.

At stage 506, the DLP server 110 can retrieve permissions of the user from the directory server 130. For example, the DLP server 110 can send the user ID to the directory server 130, and the directory server 130 can retrieve the access permissions of the user and provide them to the DLP server 110.

At stage 508, the DLP server 110 can redact portions of the content stream that the user is not authorized to access. In one example, when the meeting is originally recorded, the DLP server 110 can log confidential content identified in the content stream, the confidentiality level of the content, and the timing of the content in the meeting. The DLP server 110 can compare the user's access permissions to the confidentiality levels of the confidential content. The DLP server 110 can redact confidential content that the user does not have permission to access. For example, the DLP server 110 can remove or encrypt audio, video, or other components of the meeting corresponding to the confidential content. In one example, the DLP server can remove entire segments of the meeting that the user does not have permission to access.

At stage 510, the DLP server 110 can send a partially redacted content stream of the requested recording to the user device 150. In one example, the DLP server 110 can stream the content stream to the user device 150. In another example, the user device 150 can download a data file of the meeting.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for securing confidential content in a content stream, comprising:
   receiving a data file corresponding to an agenda for a meeting;
   identifying, based on the agenda data file, different segments of the meeting that have content with differing confidentiality levels, including first confidential content corresponding to a first confidentiality level;
   generating a first encryption key corresponding to the first confidential content;
   receiving a list of attendees for the meeting;
   determining that a first attendee on the list has permission to access the first confidential content;
   providing, to a user device associated with the first attendee, the first encryption key;
   begin receiving the content stream, the content stream corresponding to the meeting; and
   encrypting the content stream differently according to the different segments, including encrypting a first portion of the content stream corresponding to the first confidential content using the first encryption key.

2. The method of claim 1, further comprising:
   identifying, based on the agenda data file, second confidential content of a second confidentiality level;
   generating a second encryption key corresponding to the second confidential content;
   determining that a second attendee on the list has permission to access the second confidential content, but not the first confidentiality information; and
   providing, to a user device associated with the second attendee, the second encryption key.

3. The method of claim 2, further comprising:
   determining that the first attendee has permission to access the second confidential content; and
   providing, to the user device associated with the first attendee, the second encryption key.

4. The method of claim 1, further comprising:
   analyzing the content stream for additional confidential content;
   identifying third confidential content in the content stream that was not previously identified from the agenda data file;
   determining a confidentiality level of the third confidential content; and
   encrypting the third confidential content using an encryption key that corresponds to the confidentiality level of the third confidential content.

5. The method of claim 4, wherein the content stream is analyzed by applying a machine learning model to the content stream that tags additional confidential content and provides timestamps for the beginning and end of the additional confidential content.

6. The method of claim 1, further comprising:
   receiving a request to access a recording of the content stream;
   authenticating a user profile associated with the request;
   determining access permissions of the user profile;
   encrypting portions of the recording based on the user profile's access permissions; and
   providing the partially encrypted recording to a user device associated with the request.

7. The method of claim 1, wherein the encrypted first portion of the content stream corresponds to at least one of an audio component and a video component of the content stream.

8. A non-transitory, computer-readable medium containing instructions that, when executed by a hardware-based processor, performs stages for securing confidential content in a content stream, the stages comprising:
   receiving a data file corresponding to an agenda for a meeting;
   identifying, based on the agenda data file, different segments of the meeting that have content with differing confidentiality levels, including first confidential content corresponding to a first confidentiality level;
   generating a first encryption key corresponding to the first confidential content;
   receiving a list of attendees for the meeting;
   determining that a first attendee on the list has permission to access the first confidential content;
   providing, to a user device associated with the first attendee, the first encryption key;
   begin receiving the content stream, the content stream corresponding to the meeting; and
   encrypting the content stream differently according to the different segments, including encrypting a first portion of the content stream corresponding to the first confidential content using the first encryption key.

9. The non-transitory, computer-readable medium of claim 8, the stages further comprising:
   identifying, based on the agenda data file, second confidential content of a second confidentiality level;
   generating a second encryption key corresponding to the second confidential content;
   determining that a second attendee on the list has permission to access the second confidential content, but not the first confidentiality information; and
   providing, to a user device associated with the second attendee, the second encryption key.

10. The non-transitory, computer-readable medium of claim 9, the stages further comprising:
    determining that the first attendee has permission to access the second confidential content; and
    providing, to the user device associated with the first attendee, the second encryption key.

11. The non-transitory, computer-readable medium of claim 8, the stages further comprising:
- analyzing the content stream for additional confidential content;
- identifying third confidential content in the content stream that was not previously identified from the agenda data file;
- determining a confidentiality level of the third confidential content; and
- encrypting the third confidential content using an encryption key that corresponds to the confidentiality level of the third confidential content.

12. The non-transitory, computer-readable medium of claim 11, wherein the content stream is analyzed by applying a machine learning model to the content stream that tags additional confidential content and provides timestamps for the beginning and end of the additional confidential content.

13. The non-transitory, computer-readable medium of claim 8, the stages further comprising:
further comprising:
- receiving a request to access a recording of the content stream;
- authenticating a user profile associated with the request;
- determining access permissions of the user profile;
- encrypting portions of the recording based on the user profile's access permissions; and
- providing the partially encrypted recording to a user device associated with the request.

14. The non-transitory, computer-readable medium of claim 8, wherein the encrypted first portion of the content stream corresponds to at least one of an audio component and a video component of the content stream.

15. A system for securing confidential content in a content stream, comprising:
- a memory storage including a non-transitory, computer-readable medium comprising instructions; and
- a computing device including a hardware-based processor that executes the instructions to carry out stages comprising:
  - receiving a data file corresponding to an agenda for a meeting;
  - identifying, based on the agenda data file, different segments of the meeting that have content with differing confidentiality levels, including first confidential content corresponding to a first confidentiality level;
  - generating a first encryption key corresponding to the first confidential content;
  - receiving a list of attendees for the meeting;
  - determining that a first attendee on the list has permission to access the first confidential content;
  - providing, to a user device associated with the first attendee, the first encryption key;
  - begin receiving the content stream, the content stream corresponding to the meeting; and
  - encrypting the content stream differently according to the different segments, including encrypting a first portion of the content stream corresponding to the first confidential content using the first encryption key.

16. The system of claim 15, the stages further comprising:
- identifying, based on the agenda data file, second confidential content of a second confidentiality level;
- generating a second encryption key corresponding to the second confidential content;
- determining that a second attendee on the list has permission to access the second confidential content, but not the first confidentiality information; and
- providing, to a user device associated with the second attendee, the second encryption key.

17. The system of claim 16, the stages further comprising:
- determining that the first attendee has permission to access the second confidential content; and
- providing, to the user device associated with the first attendee, the second encryption key.

18. The system of claim 15, the stages further comprising:
- analyzing the content stream for additional confidential content;
- identifying third confidential content in the content stream that was not previously identified from the agenda data file;
- determining a confidentiality level of the third confidential content; and
- encrypting the third confidential content using an encryption key that corresponds to the confidentiality level of the third confidential content.

19. The system of claim 18, wherein the content stream is analyzed by applying a machine learning model to the content stream that tags additional confidential content and provides timestamps for the beginning and end of the additional confidential content.

20. The system of claim 15, the stages further comprising:
further comprising:
- receiving a request to access a recording of the content stream;
- authenticating a user profile associated with the request;
- determining access permissions of the user profile;
- encrypting portions of the recording based on the user profile's access permissions; and
- providing the partially encrypted recording to a user device associated with the request.

* * * * *